Feb. 7, 1967 T. PRICKETT, JR., ET AL 3,303,458
METHOD AND MEANS FOR ELIMINATING CROSSOVER FREQUENCIES
FROM A CONTINUOUS WAVE SEISMOGRAM
Original Filed Nov. 1, 1960 3 Sheets-Sheet 1

ATTEST.
Charles T. Steininger

INVENTORS
Tom Prickett Jr.
John P. Woods.
BY
ATTORNEY.

United States Patent Office 3,303,458
Patented Feb. 7, 1967

3,303,458
METHOD AND MEANS FOR ELIMINATING CROSSOVER FREQUENCIES FROM A CONTINUOUS WAVE SEISMOGRAM
Tom Prickett, Jr., Richardson, and John P. Woods, Dallas, Tex., assignors to The Atlantic Refining Company, Philadelphia, Pa., a corporation of Pennsylvania
Continuation of application Ser. No. 66,549, Nov. 1, 1960. This application Mar. 20, 1964, Ser. No. 354,819
5 Claims. (Cl. 340—15.5)

This application is a continuation of our abandoned application, Serial No. 66,549, filed November 1, 1960, which in turn is a continuation-in-part of our application Serial No. 453,853, filed September 2, 1954, now United States Patent No. 2,982,371.

This invention relates to an improved method and means for the reduction of early arrival energy during seismic continuous wave operations. More specifically, the invention relates to a novel method of determining filter settings for use in practicing the continuous wave method of seismic exploration and to an improved apparatus for practicing same.

Generally, this basic method includes generating a frequency modulated cyclically-varying continuous wave signal at one point on the surface of the earth, picking up the generated signal at a remote point either at the surface of the earth or down a well bore, picking up the generated signal at a point adjacent the generator and time-delaying this signal in varying amounts, and combining the variably time-delayed signal and the remotely received signal in such a manner that only the remotely detected signals having the same frequency variation as the time-delayed signal and in time phase therewith are recorded.

To better understand the present invention, which is an improvement upon the basic method disclosed in copending application 453,853, now United States Patent No. 2,982,371, it is necessary to consider the operation of a device capable of practicing the basic method.

The drawings utilized to illustrate the basic method and the improvements thereto are as follows.

Figure 1:
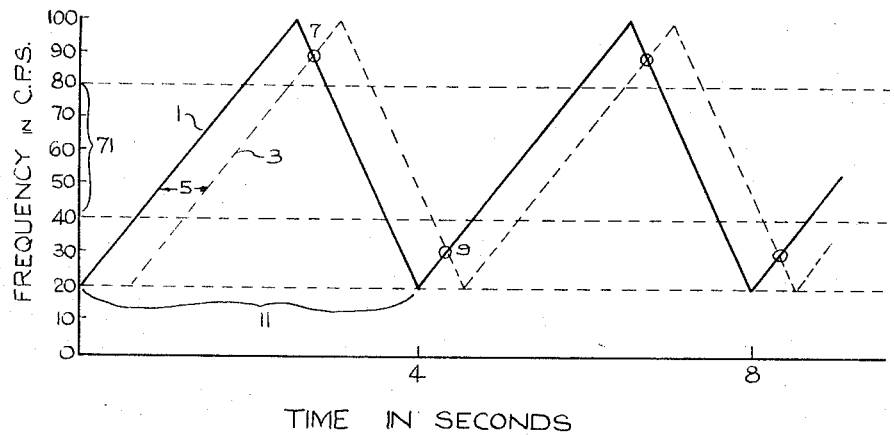
FIGURE 1 is a plot of frequency versus time of a cyclically-varying continuous wave and its delayed counterpart for use in practicing the basic method.

Refer now to FIGURE 1. For purposes of illustration, FIGURE 1 discloses a plot of frequency versus time of a generated cyclically-varying signal 1 and its delayed counterpart signal 3. The delay time 5 between signal 1 and counterpart signal 3 can be varied. Crossover points 7 and 9 are the points of common frequency of signals 1 and 3 at a given delay time 5. Period 11 is the time required for signal 1 to execute a complete sweep of its frequency variation. When a signal is generated having unequal periods, 11 represents the shortest period with respect to time. FIGURE 1 discloses a signal in which all periods 11 are equal in time.

Figure 2:
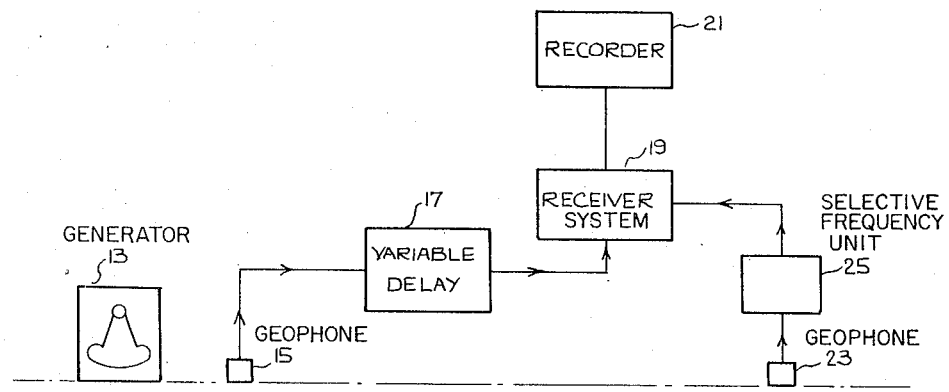
FIGURE 2 is a block diagram of an over-all device capable of practicing the basic method and improvement thereto.

FIGURE 2 discloses in block form a device capable of practicing the basic method and the present invention. The drawing includes continuous wave generator 13, geophone 15, variable delay 17, receiver system 19, recorder 21, second geophone 23, and means 25 for passing a predetermined frequency band width. The improvement to the subject basic method is represented by 25 and will be described in detail hereinafter.

Figure 3:
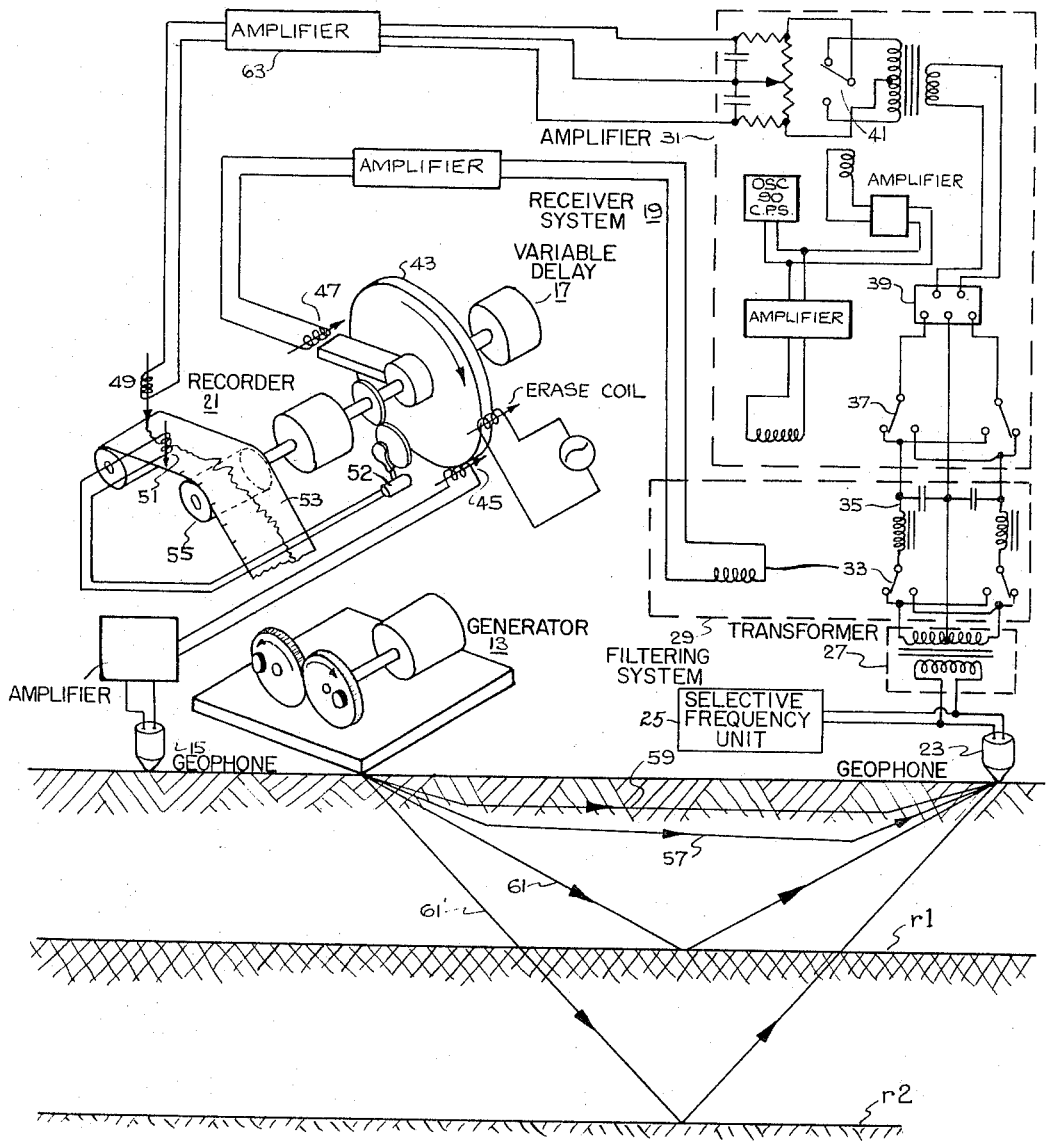
FIGURE 3 is one embodiment of a device capable of practicing the basic method of operation.

Refer now to FIGURE 3 which shows in schematic form a device capable of practicing the basic method of operation. The device contains the same basic elements as shown in FIGURE 2, and includes a continuous wave generator 13, geophone 15, variable delay 17, receiver 19, recorder 21, and second geophone 23.

Assuming continuous wave generator 13 produces a cyclically-varying signal 1 with a period 11, shown in FIGURE 1, portions of signal 1 will be reflected from the various subsurface beds r1 and r2, such as shown in FIGURE 3 and as will be detailed hereinafter. Continuous wave generator 13 may be any suitable type of generator; however, it is preferable that the device be the generator and control means disclosed in copending application 66,548, now U.S. Patent 3,229,784, owned by a common assignee. Receiver 19 can be broken down into three basic parts, i.e., coupling transformer 27, filtering unit 29, and amplifier 31. This particular embodiment utilizes relay 33 and narrow pass band filter 35 in filter system 29. Chopper type amplifier 31 includes synchronous relay 37, narrow band amplifier 39, and synchronous relay 41. Variable delay 17 includes magnetic drum 43, recording head 45, and rotating pickup head 47, in which the angular displacement of pickup head 47 denotes the time delay after which a signal recorded by head 45 is picked up. Recorder 21 includes pen 49 for recording the signal, pen 51 for placing timing marks on the record in response to pulses from microswitch 52, chart 53, and drive 55.

Let us now assume that generator 13 is programmed to produce a cyclically-varying signal such as one shown in FIGURE 1. Path 57 represents earliest refracted waves produced therefrom and path 59 represents horizontally traveling waves. Paths 61 and 61' are signals reflected from two beds of interest, r1 and r2. Seismometer 23 receives horizontally-traveling, reflected and refracted waves and noise, all of which are amplified by transformer 27. The combined useful signals and noise are impressed on relay 33. The frequency of relay 33 is controlled by the time-delayed signal received by geophone 15 and time delay unit 17, which is set into operation immediately after generating waves in the ground. As pickup head 47 rotates and picks up the signal from geophone 15 after a time delay, it eventually reaches a position where the time delay of the signal it picks up is equal to the travel time of a useful seismic wave picked up by geophone 23. At this point of coincidence, relay 33, which is continuously actuated by the time-delayed signal, converts the frequency modulated signal representing such useful wave into a low frequency signal. This low frequency signal is passed through low pass narrow band filter 35 and then amplified by means of amplifier units 31 and 63, and thereafter used to drive recording pen 49 and mark an inflection on recording chart 53 which indicates the passing of a useful signal through filter unit 29. Meantime, the time delay of pickup head 47 is indicated on chart 53 by time delay marks recorded by head 51. Accordingly, a record is obtained by which the indication of a useful signal can be correlated in respect to the time delay of the time-delayed signal which controls the passing of the useful signal through the low pass narrow band filter. Since the filter unit 29 only passes a signal representing a useful seismic wave when the time delay of pickup head 47 is equal to the travel time of such useful wave, the determination of the time delay of the time-delayed signal controlling filter system 29 at the given instant when a signal is passed by 29, denotes the travel time of the useful seismic wave represented by the recorded signal.

From the detailed discussion above, it is clear that one of the advantages of the basic method disclosed in the subject copending application is that little or no signal is passed through receiver 19, FIGURE 2, unless a reflected signal 1 and its delayed counterpart 3 (FIGURE 1) are in synchronism. The various devices instrumented and illustrated in the subject basic method application pass signal 1 or portions thereof when signal counterpart 3 is completely in synchronism with 1; i.e., delay 5 equals the two-way travel time to a reflecting subsurface formation and when signals 1 and 3 intersect, such as at crossover points 7 and 9. From FIGURE 1, it is obvious that crossover points 7 and 9 will be passed and recorded as unwanted signals as delay time 5 is varied throughout its predetermined excursion.

It is, therefore, an object of this invention to provide a method and apparatus for preventing erroneous indications of signal coincidence.

A further object of this invention is to provide a method and apparatus for preventing indications of incomplete signal coincidence.

A further object of this invention is to provide a method of selecting band pass width to eliminate crossover frequencies.

A further object of this invention is to provide a method of selecting proper filter settings to prevent the passage of crossover frequencies.

A further object of this invention is to provide an improved apparatus for practicing the subject basic method and preventing the passage of crossover frequencies.

The general arrangement and other objects of our invention may be more readily determined by the discussion to follow.

Briefly, the invention for preventing the erroneous indication of signal synchronism and early arrival noise in continuous wave seismic operations includes the steps of presenting in terms of frequency versus time a minimum predetermined period of a generated cyclically-varying signal and a corresponding period of the cyclically-varying signal counterpart separated from the signal by a predetermined amount, establishing frequencies at which the signal and the delayed counterpart signal intersect, and using the intersecting frequencies to determine the settings of a frequency selective apparatus.

The invention can be practiced in various ways to include manual, electrical, and electrical-mechanical operation. Regardless of the manner in which the invention is practiced, the purpose of the operation is to ascertain the maximum and minimum limits of a frequency spectrum that lies within the generated continuous wave frequencies span, but that does not include the crossover frequencies.

Refer again to FIGURE 1. As pointed out heretofore, it is necessary in continuous wave operations to know the maximum depth of interest or the two-way travel time to the deepest bed of interest so that the minimum period 11 of the generated signal 1 is greater than this travel time. Since the rate of acceleration and deceleration of signal 1 is usually predetermined prior to the operation and known exactly in case a programmer is utilized such as disclosed in copending application 66,548, now U.S. Patent 3,229,-784, it is a simple matter to plot signals 1 and 3 in terms of frequency versus time. By manually plotting the two signals with the maximum delay time 5 used to separate signals 1 and 3, crossover points 7 and 9 will be at the extreme frequency limits of the usable crossover-free spectrum band. That is, if the minimum period 11 is used in plotting signals 1 and 3, the frequencies of crossover points 7 and 9 can be used as the excluded extremes of the band of frequencies to be passed by the receiver.

Figure 4:
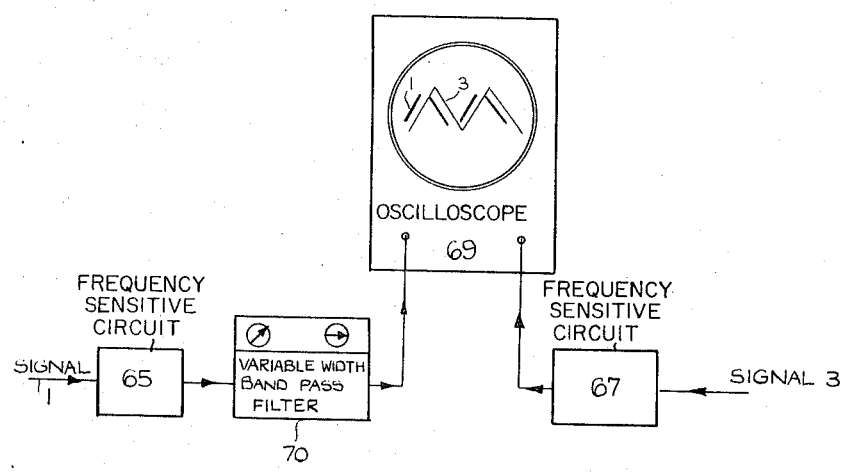
FIGURE 4 is a block diagram of a device for locating crossover frequencies in accordance with the present application.
Figure 5:
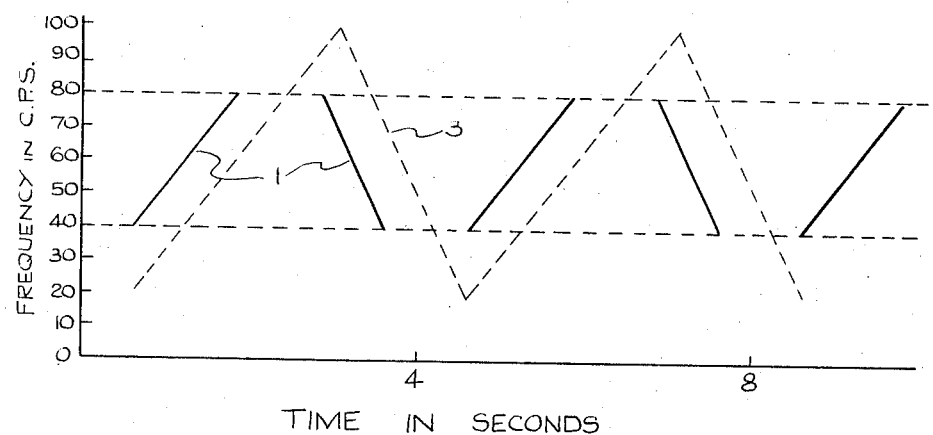
FIGURE 5 is a plot of signals shown in FIGURE 1 after the crossover frequencies are filtered in accordance with the present application.

If it is desirable to locate the crossover points by electronic means, the system as shown in FIGURE 4 may be utilized. The outputs of any well-known frequency-sensitive circuits 65 and 67 (each designed to increase the amplitude of its D.C. output as the input frequency increases) are connected to a long, persistent, double-beam oscilloscope 69. The frequency-sensitive circuits are then connected to devices for receiving a cyclically-varying continuous wave signal 1 and its delayed counterpart, signal 3, FIGURE 1. A variable width band pass filter with a sharp cut-off, shown as 70 is connected between circuit 65 and scope 69. Then, if as described above, the generated signal 1 is produced with its shortest period of cyclic variation and the counterpart signal 3 is delayed by the maximum delay time, the long, persistent scope 69 will present signals 1 and 3 plotted frequency versus time. If filter 70 is set to pass all the frequencies in signal 1, the presentation will appear as FIGURE 1. In this case, the crossover frequencies 7 and 9 can be read directly from the scope. If it is desirable to adjust the filter until the signals meet as shown in FIGURE 4, the crossover frequencies can be read from the filter setting. Of course, other suitable types of devices may be utilized to present plots of frequency versus time to ascertain crossover points.

After the crossover point frequencies have been selected, it is necessary to instrument a device such as block 25, FIGURE 2, for allowing only a selected frequency band 71 to pass to receiver 19. Various types of selective frequency units, such as narrow pass band filters, frequency-sensitive switches, and the like, can be utilized in block 25 to pass the selected band of frequencies. In fact, the operation can be carried out by hand if so desired. For instance, if a signal is generated, such as shown in FIGURE 1, with a minimum period of approximately four seconds, it is possible to utilize a frequency-sensitive meter, resonant reeds, or tuned circuits, with an oscilloscope to detect the signal as it changes frequency and a manual switching means. In such a case, the frequency excursion of signal 1 is observed and the switch is manually closed after the frequency passes frequency 9 and opened before it increases to frequency 7. As signal 1 decreases, the procedure is reversed and the switch is closed after frequency 7 is passed, and opened before frequency 9 is reached. The preferable means of instrumenting the improvement is to utilize a narrow pass band filter, the upper limit of which is set a selected distance below crossover frequency 7 and above crossover frequency 9. This narrow pass band filter would be positioned in block 25 in FIGURES 2 and 3.

Regardless of the type equipment used to practice the basic method, whether it be equipment to practice a velocity survey, a seismic exploration, etc., the apparatus suitable for passing the selected frequency band is positioned immediately above the seismometer and before the receiver. This is necessary since, otherwise, the receiver as disclosed in the basic method will pass all frequencies in synchronism or points thereof, such as crossover points.

Although the methods and apparatuses have been illustrated for operation on seismic data, it is obvious that the invention is just as appropriate for well velocity operations and other exploration operations requiring the screening of crossover points. Therefore, it is to be observed that, although specific embodiments of the instant invention have been illustrated and described herein, various modifications and substitutions may be made, which will be obvious to those skilled in the art, without departing from the scope of the present invention which is limited only by the appended claims.

We claim:

1. A method of eliminating crossover frequencies in a continuous wave exploration operation utilizing a first cyclically-varying signal of predetermined periods and a second cyclically-varying signal counterpart variably delayed in time with respect to said first signal by predetermined amounts comprising the steps of:

(a) presenting in terms of frequency versus time a minimum predetermined period of said cyclically-varying signal and a minimum predetermined period of the cyclically-varying signal counterpart separated from said signal by a maximum predetermined delay, (b) measuring those frequencies at which said signal and said delayed counterpart signal intersect, and (c) adjusting a selective frequency unit to pass frequencies between the highest low frequency crossover point and the lowest high frequency crossover point.

2. An apparatus for reducing early arrival noise in a continuous wave seismic system utilizing a first cyclically-varying signal of predetermined periods and a second cyclically-varying counterpart variably delayed in time from said first signal predetermined amounts comprising, (a) a continuous wave generator, (b) a geophone at a position remote from said generator, (c) a second geophone adjacent said generator, (d) a continuously varying delay means electrically connected to said adjacent geophone, (e) a filtering system whose pass band is controlled by the signal from said delay means connected to the output of said remote geophone, and (f) selective frequency means having a pass band between those frequencies at which the signal from said remote geophone and the delayed signal from said delay means cross one another when said delay means is at its maximum delay and connected between said remote geophone and said filtering system.

3. In the method of obtaining geophysical measurements comprising the steps of generating in the earth useful seismic waves of cyclically varying frequency, receiving by means of a receiver said useful waves and noise accompanying said waves at a location remote from the source of said generated waves after a time interval later than the time when said waves were generated, said time interval being equal to the travel time of said useful seismic waves to the receiver, transforming said waves and noise reieved by said receiver into a first electrical signal, producing a second electrical signal having a frequency in respect to time substantially in phase with the varying frequency of said generated useful seismic waves, time delaying said second electrical signal, filtering said first signal by means of a narrow band filter in order to separate the portion of the signal representing the useful seismic wave from a portion of the signal representing said noise, controlling the frequency band of said filter by means of said time delayed second signal, and thereafter measuring the amplitude of said first signal passed by said filter simultaneously with the time delay of said second time delayed signal to determine the travel time of said wave to said receiver, the combination therewith of the step of acting upon said remotely received seismic waves by means of a selective frequency unit which passes frequencies between the highest low frequency crossover point and the lowest high frequency crossover point of said first and second electric signals, said step occurring after said seismic waves are received by said remote receiver and before said first signal is filtered by said narrow band filter.

4. A method for eliminating crossover frequencies in a continuous wave exploration operation utilizing a first cyclically-varying signal of predetermined periods and a second cyclically-varying counterpart variably delayed in time with respect to said first signal by predetermined amounts comprising acting upon said first cyclically-varying signal by means of a selective frequency unit which passes frequencies between the highest low frequency and lowest high frequency crossover points of said first and second cyclically-varying signals, said high and low crossover points being taken for the minimum predetermined period of said first and second cyclically-varying signals.

5. A method for eliminating crossover frequencies in a continuous wave exploration operation utilizing a first cyclically-varying signal of predetermined periods and a second cyclically-varying counterpart variable delayed in time with respect to said first signal by predetermined amounts comprising acting upon said first cyclically-varying signal by means of a selective frequency unit which passes frequencies between the high frequency and low frequency crossover points of said first and second cyclically varying signals, which crossovers are characteristic of the shortest period with respect to time for said first and second signals and the maximum predetermined time delay.

References Cited by the Examiner
UNITED STATES PATENTS

| | | | |
|---|---|---|---|
| 2,275,736 | 3/1942 | Cloud | 181—.5 |
| 2,451,822 | 10/1948 | Guanella | 340—3 |
| 2,521,130 | 9/1950 | Scherbatskoy | 181—.5 |
| 3,135,942 | 6/1964 | Tucker et al. | 340—3 |
| 3,198,281 | 8/1965 | Mifsud | 181—.5 |
| 3,209,855 | 10/1965 | Prickett et al. | 181—.5 |

BENJAMIN A. BORCHELT, *Primary Examiner.*

R. M. SKOLNIK, *Assistant Examiner.*